(12) United States Patent
Eklund (10) Patent No.: US 7,058,728 B1
(45) Date of Patent: Jun. 6, 2006

(54) METHOD AND APPARATUS FOR INITIATING COMPRESSION OF HEADERS OF PACKETS AND REFRESHING THE CONTEXT RELATED TO THE PACKETS

(75) Inventor: Carl Eklund, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/429,626

(22) Filed: Oct. 29, 1999

(51) Int. Cl.
*G06F 15/16* (2006.01)
*H04J 3/18* (2006.01)
*H04Q 7/20* (2006.01)

(52) U.S. Cl. ............... 709/247; 370/477; 370/474; 455/445

(58) Field of Classification Search .......... 709/247, 709/238, 232, 223; 370/474, 392, 469, 349, 370/477; 455/445
See application file for complete search history.

(56) References Cited

U.S. PATENT DOCUMENTS

| | | | |
|---|---|---|---|
| 5,166,926 A * | 11/1992 | Cisneros et al. ............ 370/448 |
| 5,430,727 A * | 7/1995 | Callon ....................... 370/401 |
| 5,613,069 A * | 3/1997 | Walker ....................... 375/357 |
| 5,774,660 A * | 6/1998 | Brendel et al. ............. 709/201 |
| 5,898,689 A * | 4/1999 | Kumar et al. ............... 370/232 |
| 6,032,197 A * | 2/2000 | Birdwell et al. ............ 709/247 |
| 6,061,748 A * | 5/2000 | Taglione et al. ............. 710/22 |
| 6,272,148 B1* | 8/2001 | Takagi et al. ................ 370/469 |
| 6,279,140 B1* | 8/2001 | Slane ......................... 714/807 |
| 6,370,584 B1* | 4/2002 | Bestavros et al. .......... 709/238 |
| 6,510,135 B1* | 1/2003 | Almulhem et al. ......... 370/229 |
| 6,608,841 B1* | 8/2003 | Koodli ....................... 370/474 |
| 6,618,397 B1* | 9/2003 | Huang ........................ 370/474 |
| 6,711,164 B1* | 3/2004 | Le et al. ..................... 709/247 |
| 6,754,231 B1* | 6/2004 | Jonsson et al. ............. 370/392 |

OTHER PUBLICATIONS

Degermark et al, IP Header Compression, Network Working Group, Feb. 1999, pp. 1-47.*
Deering et al, Internet Protocol, Version 6 (IPv6) Specification, Network Working Group, Dec. 1998, pp. 1-39.*
Balakrishnan et al, Improving TCP/IP Performance over Wireless Networks, ACM, 1995, pp. 2-11.*
Degermark et al, Low-Loss TCP/IP header compression for wireless networks, J.C. Baltzer AG, pp. 375-387.*
R. Hinden, IP Next Generation overview, http://playground.sun.com/ipng/INET-IPng-Paper.html, Aug. 31, 1999 ,pp. 1-20.

(Continued)

*Primary Examiner*—Ario Etienne
*Assistant Examiner*—Gregory G. Todd
(74) *Attorney, Agent, or Firm*—Squire, Sanders & Dempsey LLP (57) ABSTRACT

A method and apparatus for initiating compression of IP headers of a stream of packets to be sent from a source apparatus to a destination apparatus. IP header compression is initiated by changing the destination address of the IP header of a full header packet to identify the address of a node, such as a router, which serves as an interface to the destination apparatus, and passing the context identifier (CID) and generation fields in a routing header which immediately follows or is inserted to immediately follow the IP header.

32 Claims, 10 Drawing Sheets

OTHER PUBLICATIONS

Mikael Degermark, et al, Header Compression for IPv6, Networking Working Group, Internet Draft, Jul. 30, 1997, pp. 1-41.

S. Deering, Internet Protocol, Version 6, Network Working Group, Dec. 1998, pp. 1-39.

V. Jacobson, Compressing TCP/IP Headers for Low-Speed Serial Links, Network Working Group, Feb. 1990, pp. 1-46.

M. Degermark, IP Header Compression, Network Working Group, Feb. 1999, pp. 1-47.

S. Bradner, The Recommendation for the IP Next Generation Protocol, Network Working Group, Jan. 1995, pp. 1-46.

* cited by examiner

METHOD AND APPARATUS FOR INITIATING COMPRESSION OF HEADERS OF PACKETS AND REFRESHING THE CONTEXT RELATED TO THE PACKETS

BACKGROUND OF THE INVENTION

The present invention relates to a method and apparatus for initiating compression of headers of a stream of packets and refreshing a context related to the packets, wherein the context corresponds to the un-compressed form of the headers of the stream of packets.

In packet switched networks, packets are transmitted between nodes connected to the network to effect communication between the nodes. Information in the packets may include messages and commands such as a request for service, connection management controls, or data. Large transmissions are divided into packets instead of being transmitted as one long string.

The Internet is, for example, a packet switched network. Internet Protocol (IP) is an Internetwork protocol that defines how to format various information into packets and transmit those packets using the Internet. IP provides a near universal delivery system that can operate on almost any underlying network.

Currently IP is defined according to IPv4 with the "v4" indicating version 4 of the Internet Protocol. IPv4 serves what could be called the computer market. The focus of IPv4 is to connect computers together to permit communications over various networks where the computers range from Personal Computers (PC's) to Supercomputers. Most of the computers are attached to Local Area Networks (LAN's) and the vast majority are not mobile. The next generation Internet Protocol is referred to as IPv6 where the "v6" indicates version 6 of the Internet Protocol. IPv6 is intended to be compatible with IPv4 while addressing the needs of high performance networks (e.g., ATM) and low bandwidth networks (e.g., wireless). IPv6 also provides a platform for new Internet functionality that may be required in the future (e.g., telephony, television, video on demand, equipment control).

A common characteristic of IPv4 and IPv6 is the use of an IP header of a particular format for each of the packets for identifying the source, destination and other information related to the packet. The routing header identifies one or more intermediate nodes to be "visited" by the packet on the way to the destination. Since the format of IP headers and routing headers for IPv4 and IPv6 are similar, FIG. 1 illustrates the format of an IP header for IPv6 and FIGS. 2 and 3 illustrate the format of routing headers for IPv6.

Figure 1:
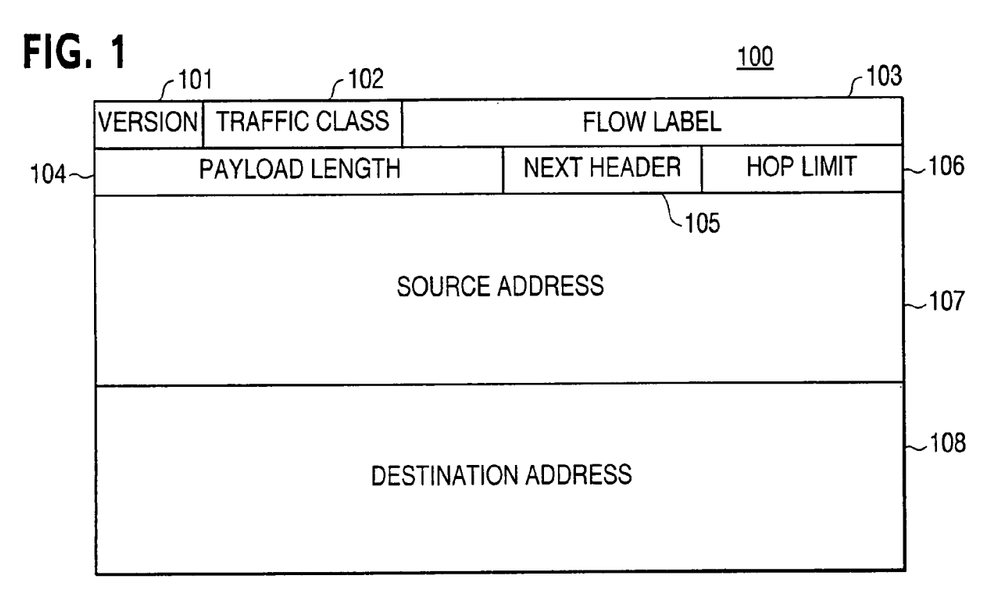
FIG. 1 is a schematic diagram illustrating the format of an IP header according to IPv6.

The IP header 100 illustrated in FIG. 1 includes a Version field 101 which stores information indicating the IP version number to which the packet corresponds, a Traffic Class field 102 which stores information indicating the desired delivery priority of the packet relative to other packets, a Flow Label field 103 which stores information indicating that the packet requires special handling such as a non-default quality of service, a Payload Length field 104 which stores information indicating the length of the rest of the packet following the IP header, a Next Header field 105 which stores information identifying the type of header immediately following the IP header, a Hop Limit field 106 which stores a value indicating the maximum number of hops permitted for the packet, wherein the value is decremented by one by each node that forwards the packet and the packet is discarded if the value is decremented to zero, a Source Address field 107 which stores the address of the initial sender (source apparatus) of the packet, and a Destination Address field 108 which stores the address of the intended recipient (destination apparatus) of the packet.

Figure 2:
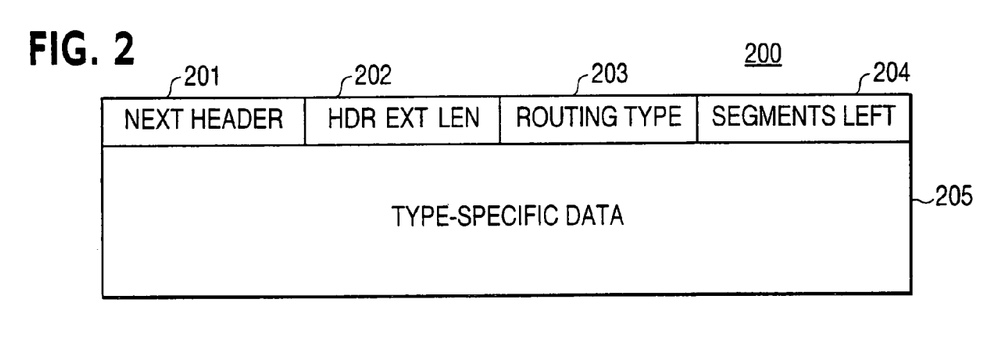
FIG. 2 is a schematic diagram illustrating the format of a routing header according to IPv6.

The routing header 200 illustrated in FIG. 2 includes a Next Header field 201 which stores information identifying the type of header immediately following the Routing header, a Header Extension Length field 202 which stores information indicating the length of the routing header, a Routing Type field 203 which stores information indicating the variant of the routing header, a Segments Left field 204 which stores a value indicating the number of route segments remaining still to be visited by the packet before the destination is reached, and a Type-Specific Data field 205 which stores information including addresses of the nodes to be visited by the packet.

Figure 3:
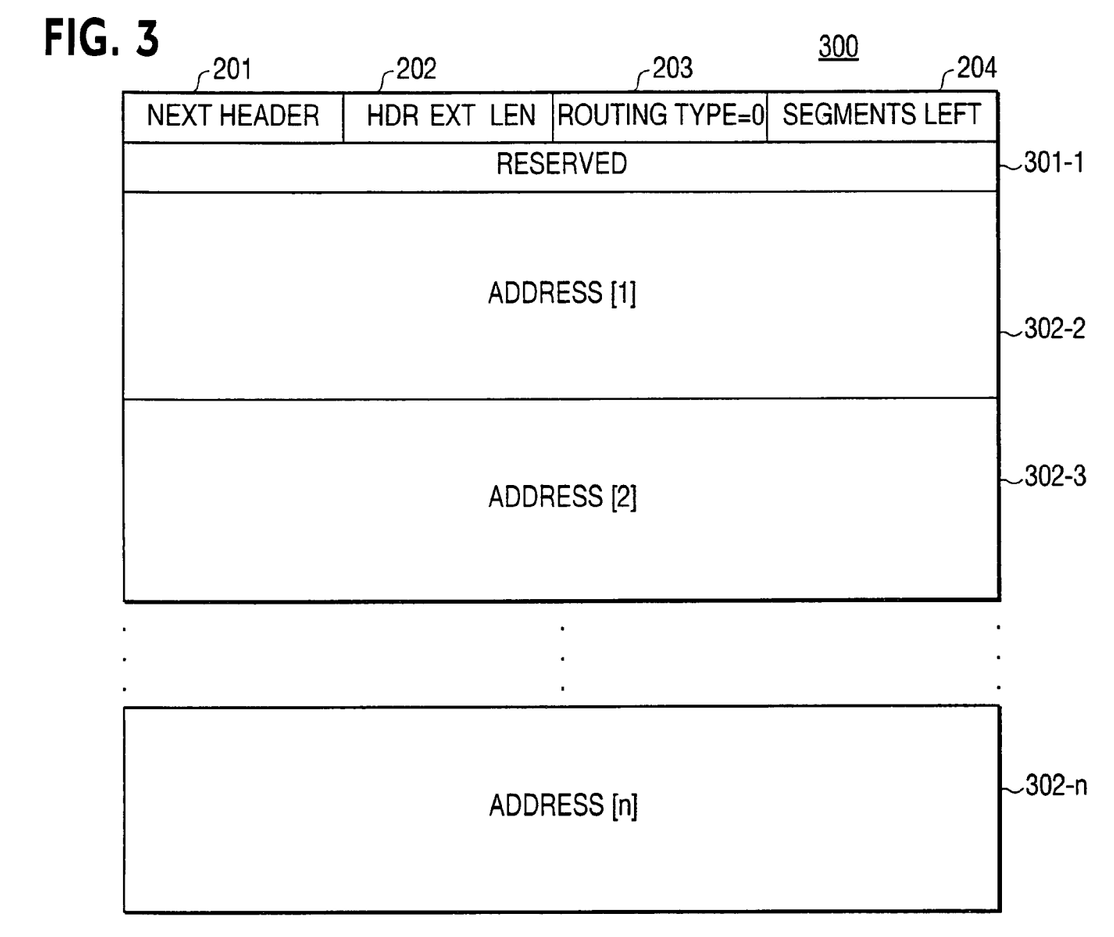
FIG. 3 is a schematic diagram illustrating the format of a Type 0 routing header according to IPv6.

The routing header 300 illustrated in FIG. 3 is a routing header where the Routing Type field 203 has a value of "0", thereby identifying it as a Type 0 routing header. The Type 0 routing header 300 illustrated in FIG. 3 includes all of the fields shown in the routing header 200 illustrated in FIG. 2 with the exception of a Reserved field 301 which is initialized by the source and can be used in any manner by the intermediate nodes, and Address fields 302-1 to 302-n which include a sequence of addresses of nodes to which the packet is to be routed including the address of the destination. For the type 0 routing header 300, the bits of the Reserved field 301 are all set to "0". Thus, in order to implement an IP header compression scheme, a routing header of its own is needed.

Much of the header information stays the same over the lifetime of a packet stream. For Non-Transmission Control Protocol (TCP) packet streams, almost all fields of the headers are constant. For TCP packet streams, many fields of the headers are constant and others change with small and predictable values.

To initiate compression of the headers of a packet stream, a packet having a full header (Full Header Packet) carrying Context Identifier (CID) and generation fields are transmitted over the link between first and second nodes as part of the Length fields of the IP header. The compressor (first node) and decompressor (second node) store most fields of this full header as the context which is referred to by the CID. The context includes each of the fields of the header whose values are constant and thus need not be sent over the link at all, or change little between consecutive headers so that it uses fewer bits to send the difference from the previous value compared to sending the absolute value. Thus, after the full header packet is transmitted, subsequent packets are transmitted without headers or with compressed headers having the CID and information of the headers that is unpredictable.

Any change in fields that are expected to be constant in a packet stream will cause the compressor to send a full header packet again to update the context at the decompressor, thereby refreshing the context. As long as the context is the same at the compressor and decompressor, headers can be decompressed to be exactly as they were before compression. However, if a full header packet or compressed header packet is lost during transmission, then the context of the decompressor may become obsolete as it has not been updated properly. Compressed headers will then be decompressed improperly.

Compressing IP headers in the manner described above conserves the bandwidth of slow or medium speed links. The need for compression of IP headers is even greater for IPv6 systems due to the length of the IP headers and the desire to address the needs of high performance systems.

The auto-configuration feature of IPv6 makes it attractive for mobile applications. Link speeds in systems implementing mobile applications are often relatively low, however the number of the such systems can be large, thereby making it highly desirable to use header compression.

The above described method of performing IP header compression is disclosed in "IP Header Compression", by M. Degermark, et al, Internet Draft, Networking Group IETF, February 1999 (Reference 1). The method disclosed in Reference 1 is based on the IPv4 header compression method disclosed in "Compressing TCP/IP Header for Low Speed Serial Length RFC 1144", Networking Group IETF, February 1990 (Reference 2).

However, the method disclosed by Reference 1, which is based on Reference 2, suffers from various disadvantages. Namely, when initiating IP header compression, the CID and generation which are included in the Length fields of the IP header must be passed to the IP layer by the underlying network layer. The length of the CID and generation fields varies depending on the transported protocol. Thus, the disclosed method requires that a node, such as a router, thoroughly examine and process the nested headers of each and every packet to detect when header compression is to be initiated. Such a procedure requires significant overhead, thereby reducing the efficiency of the network. Further, the disclosed method preempts the use of padding in layer 2 packets.

SUMMARY OF THE INVENTION

The present invention overcomes the above by initiating compression of IP headers of a stream of packets to be sent from a source apparatus to a destination apparatus by changing the destination address of the IP header of a full header packet to identify the address of a node, such as a router or a host, which serves as an interface to the destination apparatus, and passing the context identifier (CID) and generation fields in a routing header which immediately follows or is inserted to immediately follow the IP header.

The present invention provides a method and apparatus for initiating compression of IP headers of a stream of packets to be sent from a source apparatus to a destination apparatus in a packet switched network. The source and destination apparatuses can, for example, be a host and a router respectively or a first host and a second host, respectively. For the description proposed, the source and destination apparatuses will be assumed to be first and second hosts respectively. The source apparatus is connected to the packet switched network by a first router and the destination apparatus is connected to the packet switched network by a second router.

The present invention provides that at the first router the IP header of a full header packet of the stream of packets is modified so that the destination address field of the IP header contains a second router address indicating a location of the second router. Further, at the first router, a routing header is inserted in the full header packet of the stream of packets after the IP header. The inserted routing header includes the CID identifying the context and a destination address indicating a location of the destination apparatus. If a routing header already exists in the full header packet then the routing header is modified to include the CID identifying the context and a destination address indicating a location of the destination apparatus.

The full header packet including the modified IP header and the inserted or modified routing header is transmitted from the first router to the second router. Header compression of the IP headers of packets of the stream of packets subsequent to the full header packet is initiated upon receipt by the second router of the full header packet including the modified IP header and the inserted or modified routing header.

Specifically, compression is initiated by the second router examining and processing the full header packet upon detecting that the destination address in the IP header is its own address. A context is created corresponding to the IP header by storing information of the IP header in corresponding relation to the CID in the second router. The context including information of the IP header is also stored in corresponding relation to the CID in the first router. If the CID has been previously stored in the second router, then information of the IP header is updated to new values indicated by the IP header of the full header packet, thereby refreshing the context.

After the initiation of compression of IP headers, the IP headers of packets subsequent to the full header packet of the stream of packets are compressed by transmitting the subsequent packets without their IP headers. In practice however, the subsequent packets are sent with compressed IP headers each having the CID and information of the IP header that is unpredictable. Decompression of the IP headers of the packets subsequent to the full header packet of the stream of packets is accomplished in the second router by referring to the stored context using the CID.

In the present invention, header compression is initiated without the second router having to thoroughly examine and process the nested headers of each packet of a stream of packets to detect the beginning of header compression. The second router need only examine and process a packet which identifies the second router as its destination. In the present invention, the modified IP header of the full header packet transmitted from the first router to the second router contains information in the destination address field indicating the second router is its destination.

BRIEF DESCRIPTION OF THE DRAWINGS

The present invention will be more apparent from the following detailed description, when taken in conjunction with the accompanying drawings, in which.

DETAILED DESCRIPTION OF THE INVENTION

The features of the present invention will be described according to the elements of the present invention illustrated in FIGS. 4–14.

The present invention provides a method and apparatus for initiating compression of IP headers of a stream of packets to be sent from a source apparatus to a destination apparatus by changing the destination address of the IP header to identify the address of a node, such as a router or a host, which serves as an interface to the destination apparatus and passing the Context Identifier (CID) and Generation fields in a routing header which immediately follows or is inserted to immediately follow the IP header of the full header packet of the stream of packets. Once the CID and Generation has been passed according to the present invention a context is established that allows for the compression of IP headers of packets of the stream of packets subsequent to a full header packet.

Compression of the IP headers of the packets of the stream of packets subsequent to the full header packet is accomplished by transmitting the packets without their IP headers. In practice however, the subsequent packets are sent with compressed IP headers each having the CID and information of the IP header that is unpredictable.

Decompression of the IP headers of the packets of the stream of packets subsequent to the full header packet is accomplished by referring to the context using the CID and restoring the IP headers to the packets. The source and destination apparatuses can, for example, be a host and a router, respectively or a first and a second host, respectively. In the following description, the source and destination will be assumed to be first and second hosts respectively. However, the present invention is not limited to such an embodiment.

Figure 13:
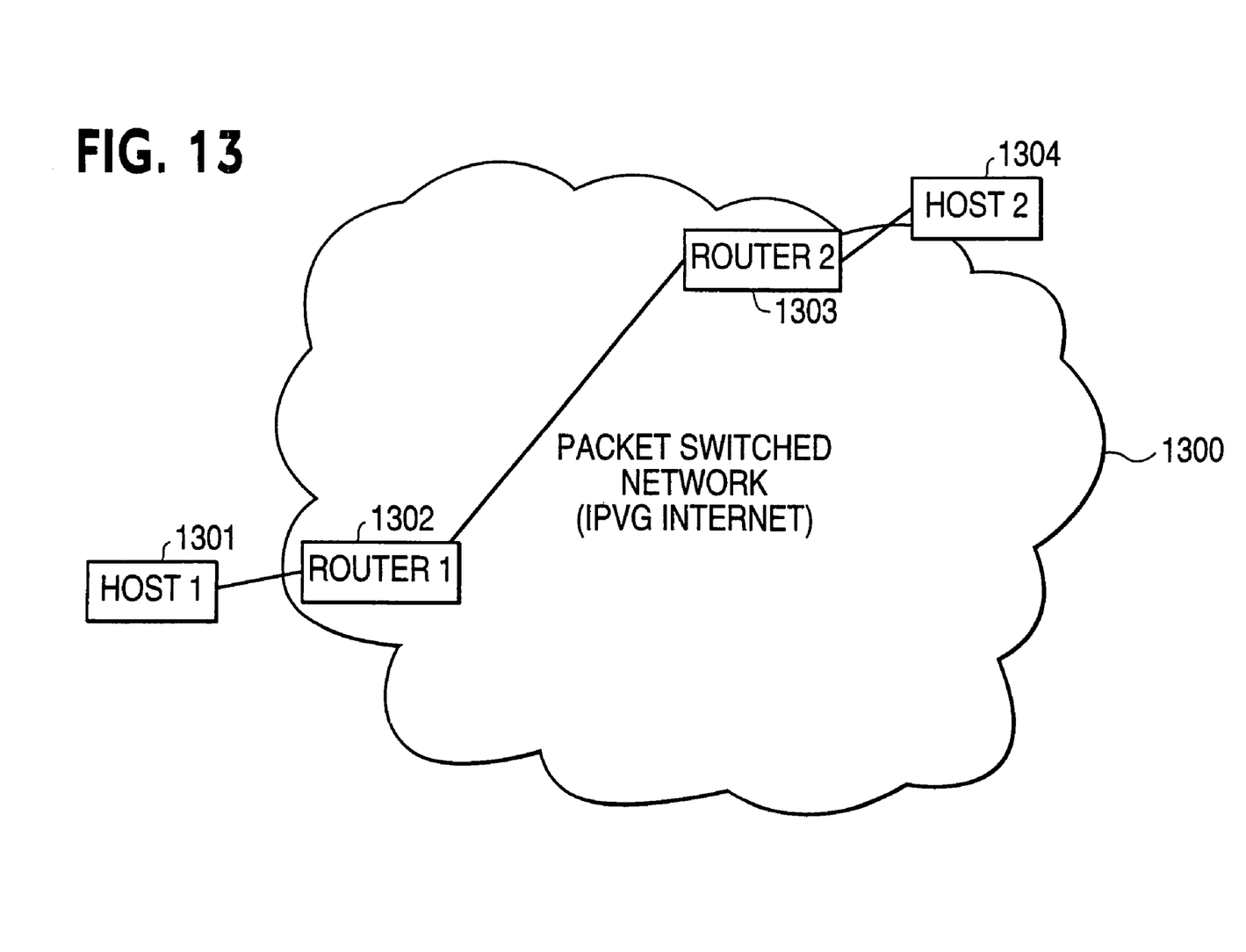
FIG. 13 is a schematic diagram illustrating the present invention when applied to a packet switched network having first and second routers, and first and second hosts.

The present invention can be applied to apparatus such as that illustrated in FIG. 13. The present invention is intended to operate in a packet switched network 1300 which may conform to IPv4 or IPv6. As illustrated in FIG. 13 a first host 1301 is connected to the packet switched network 1300 by a first router 1302. The first router 1302 serves as an interface between the first host 1301 and the packet switched network 1300. Transmission can be conducted from the first router 1302 to any one of a number of routers included in the packet switched network 1300 such as a second router 1303. The second router 1303 connects the second host 1304 to the packet switched network 1300. Thus, the second router 1303 interfaces the second host 1304 to the packet switched network 1300.

Transmission can be conducted from the first host 1301 to the second host 1304 via the first router 1302 and the second router 1303. For a stream of packets formatted according to the IPv4 or IPv6 and transmitted between the first host 1301 and the second host 1304, a considerable amount of redundant information in the headers of the packets must be processed and sent. In order to lessen the overhead for transmitting a stream of packets from the first router 1302 to the second router 1303, compression of the IP headers of the packets is conducted. In the present invention, initiating IP header compression is performed in a unique manner to further lessen the amount of processing required by the routers, particularly the second router (decompressor) 1303. A description of the procedures of the present invention for initiating IP header compression in the apparatus illustrated in FIG. 13 is provided below relative to FIG. 4.

Figure 4:
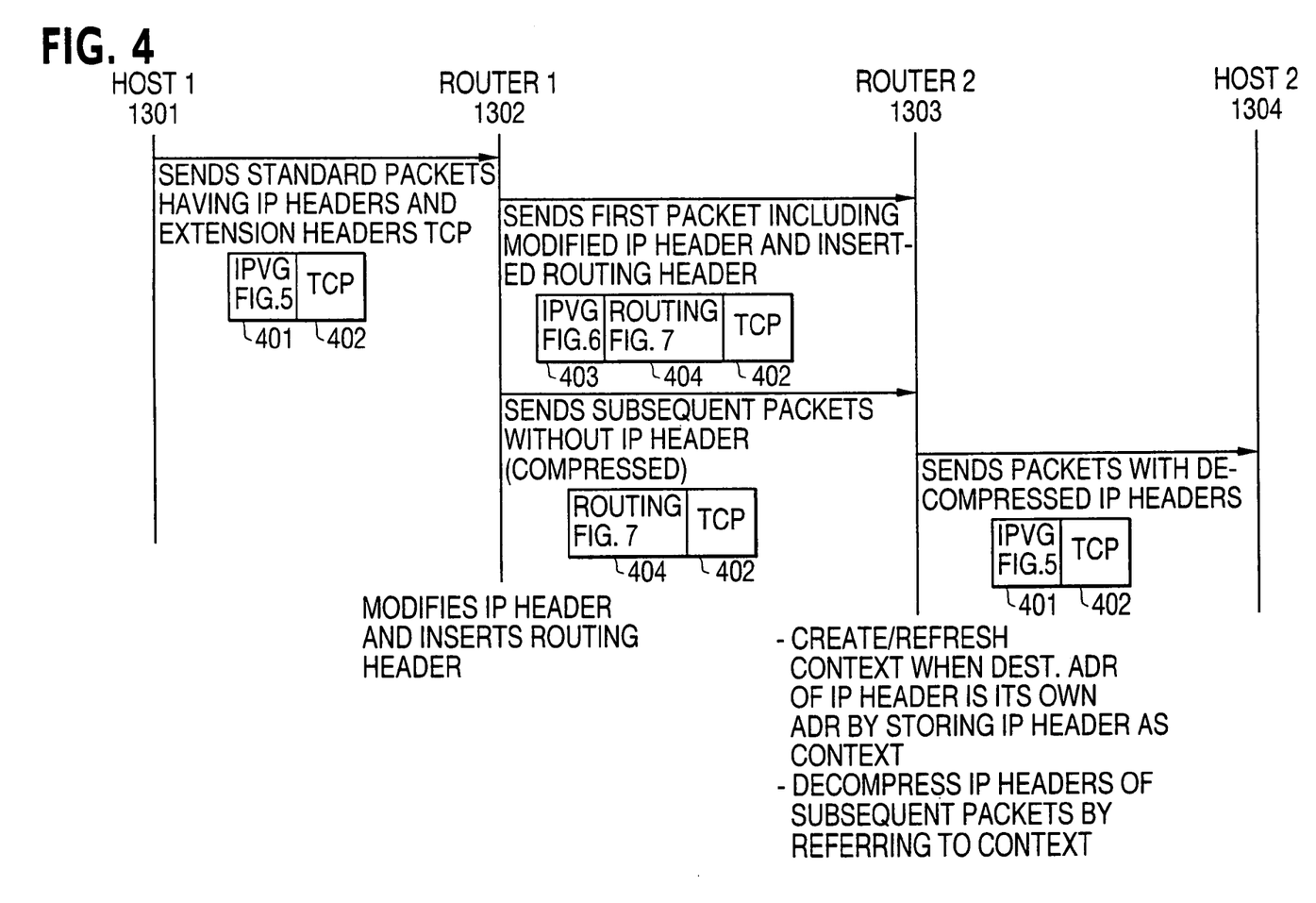
FIG. 4 is a schematic diagram illustrating the sequence of processings performed by the first and second hosts and the first and second routers when the packets sent by the first host do not include routing headers.
Figure 5:
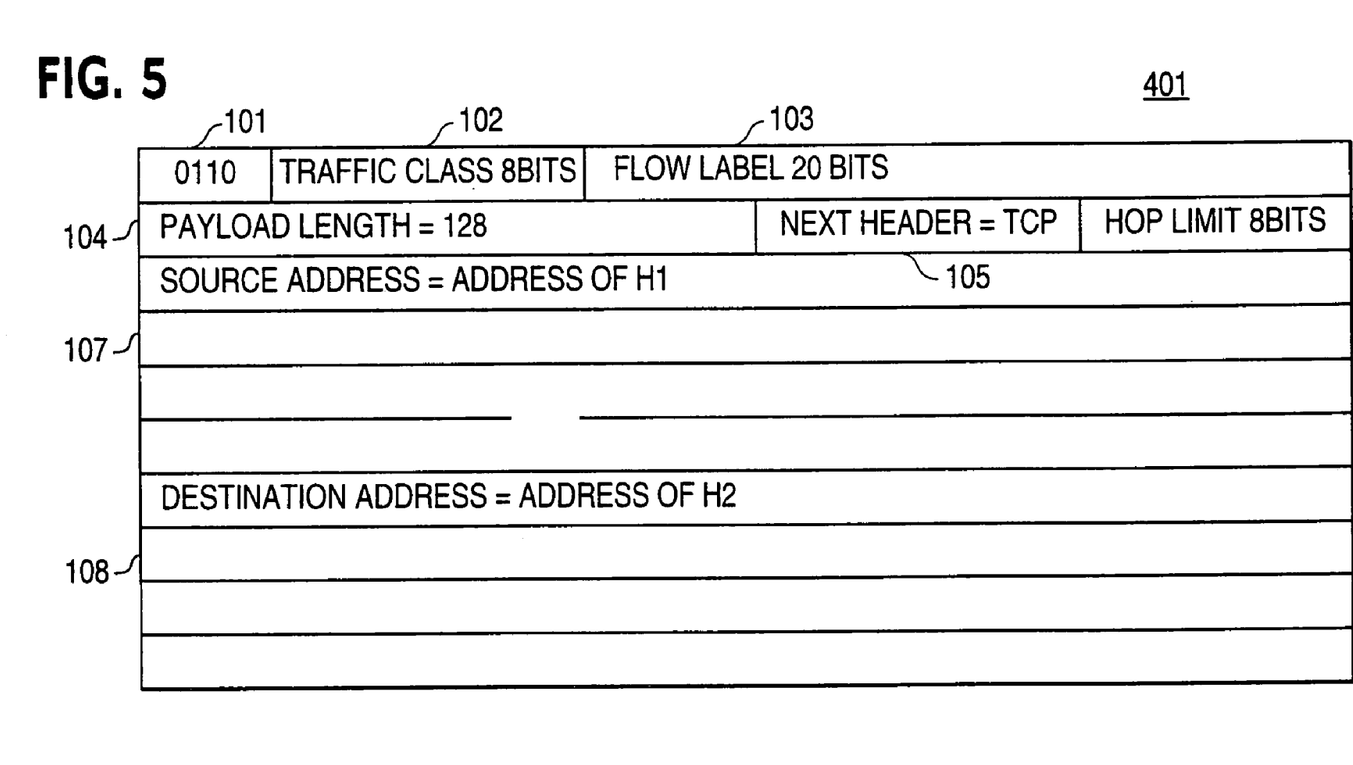
FIG. 5 is a schematic diagram illustrating the format of an IP header according to IPv6 of a packet sent from the first host.

According to FIG. 4, the first host 1301 sends a standard stream of packets each having an IP header 401, the details of which are illustrated in FIG. 5, and a Transmission Control Protocol (TCP) header 402. The IP header illustrated in FIG. 5 has the same format as the IP header illustrated in FIG. 1 with the exception that some of the fields included in the IP header are defined. For example, the Version field 101 stores a value of "0110" indicating an IPv6 header, the Next Header field 105 stores information indicating that the next header is a TCP header, the Source Address field 107 stores an address of the first host 1301 and the Destination Address field 108 stores an address of the second host 1304. It should be noted that the present invention can operate with any type of payload protocol besides TCP, such as User Data Protocol (UDP), Routing Table Protocol (RTP) or Internet Control Message Protocol (ICMP).

Figure 6:
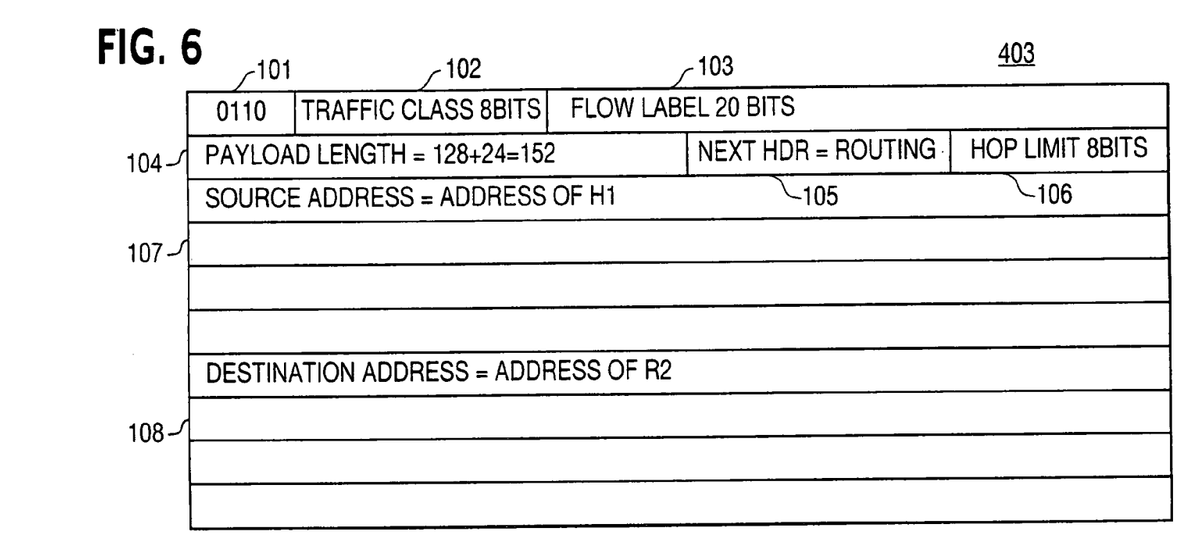
FIG. 6 is a schematic diagram illustrating the format of a modified IP header included in the full header packet sent from the first router.
Figure 7:
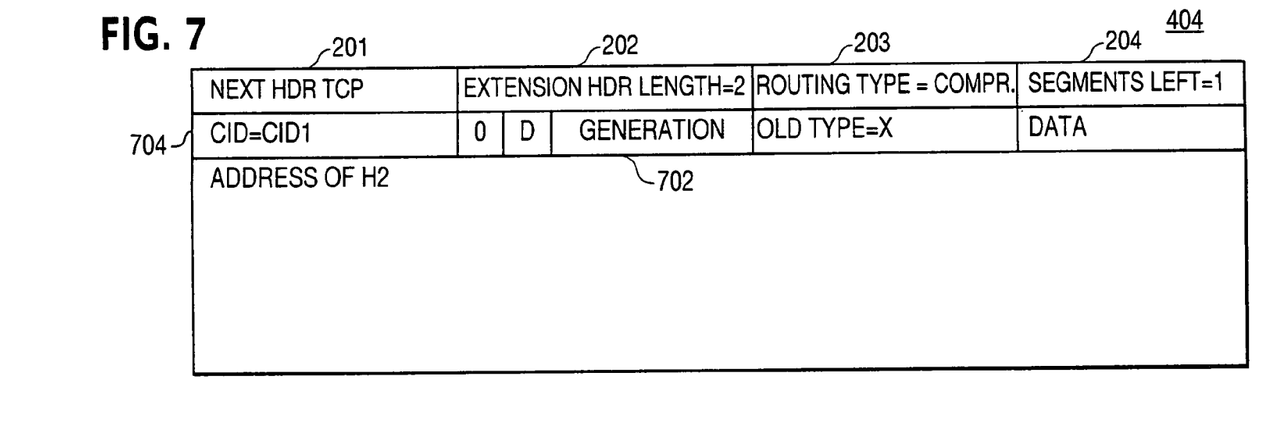
FIG. 7 is a schematic diagram illustrating the format of a routing header inserted in the full header packet sent from the first router.

The first router 1302 receives the stream of packets and modifies the IP header of a full header packet in the manner illustrated in FIG. 6 and inserts a routing header such as that illustrated in FIG. 7. The first router 1302 then sends the full header packet including the modified IP header 403 illustrated in FIG. 6 and the routing header 404 illustrated in FIG. 7 to the second router 1303.

The modified IP header 403 illustrated in FIG. 6 has the same format and essentially the same information stored in the fields thereof as the IP header 401 illustrated in FIG. 5. However, in the IP header 401 the address of the second host 1304 is stored in the Destination Address field 108, whereas in IP header 403 the address of the second router 1303 is stored in the Destination Address field 108. Storing the address of the second router 1303 in the Destination Address field 103 of the IP header 403 causes the second router 1303 to examine and process the full header packet in a manner so as to initialize IP header compression. All other packets having an address other than the second router 1303 in the Destination Address field 108 of the IP header are ignored and need not be examined and processed by the second router 1303.

FIG. 7 illustrates the routing header 404 which is inserted in the full header packet to be transmitted from the first router 1302 to the second router 1303. The routing header 404 essentially has the same format as the routing header 200 illustrated in FIG. 2 with the exception that values are stored in each of the fields. The Next Header field 201 has stored therein information indicating that the next header is a TCP header, the Header Extension Length field 202 has stored therein the value "2" indicating that the length of the routing header is 2 octets, the Routing Type 203 field has stored therein information indicating its type is COMPR., the Segments Left field 204 has stored therein a value indicating that one segment is left to be visited by the packet and the Type-Specific data field 205 has stored therein the address of the second host 1304.

Further, the routing header 404 provides various additional fields indicative of the context related to the compression of the IP header. Specifically, the routing header 404 includes a CID field 701 which stores a context identifier CID1 which identifies or is the label of IP header that forms the context. The context is an uncompressed version of the header of the full header packet last sent by the first router 1302 (compressor) and received by the second router 1303 (decompressor) over a link connecting the compressor and the decompressor. The context includes information from the fields of the IP header that do not change or can be inferred (e.g., the size of the link-level packet), and a Generation field 702 which has stored therein information associated with the CID and related to the context for non-TCP packet streams. The context, namely the IP header of the full header packet, is stored in the first router 1302 and the second router 1303 in corresponding relation to the CID, and the Generation, if the packet is a non-TCP packet.

The first router 1302 sends the full header packet including the modified IP header 403 and the inserted routing header 404 to the second router 1303. The second router 1303 upon receipt of the full header packet including the modified IP header 403 and the inserted routing header 404 creates a context related to the packet stream to which the full header packet belongs or refreshes a previously stored context corresponding to the packet stream to which the full header belongs. The second router 1303 creates a context by storing information of the IP header 403 for later use in corresponding relation to CID1 stored in the CID field 701 of the routing header 404. The second router 1303 refreshes the context by updating values and information of the previously stored IP header with the values and information provided by the IP header 403 of the full header packet.

After conducting the above described processes, IP header compression has been initiated. Accordingly, the first router 1302 now sends all subsequent packets of the packet stream to the second router 1303 without the IP header. In practice however, the subsequent packets are sent with compressed IP headers which contain the CID and information corresponding to fields that are unpredictable. Accordingly, from this point forward IP header compression is being conducted so as to transmit a reduced amount of data from the first router 1302, which serves as the compressor, to the second router 1303, which serves a the decompressor. The second router 1303 decompresses the IP headers of the subsequent packets by referring to the previously stored context by use of the CID transmitted with the subsequent packets. Thus, the second router 1303 restores the subsequent packets to their original format including the IP header and sends the restored packets to the second host 1304.

Figure 14:
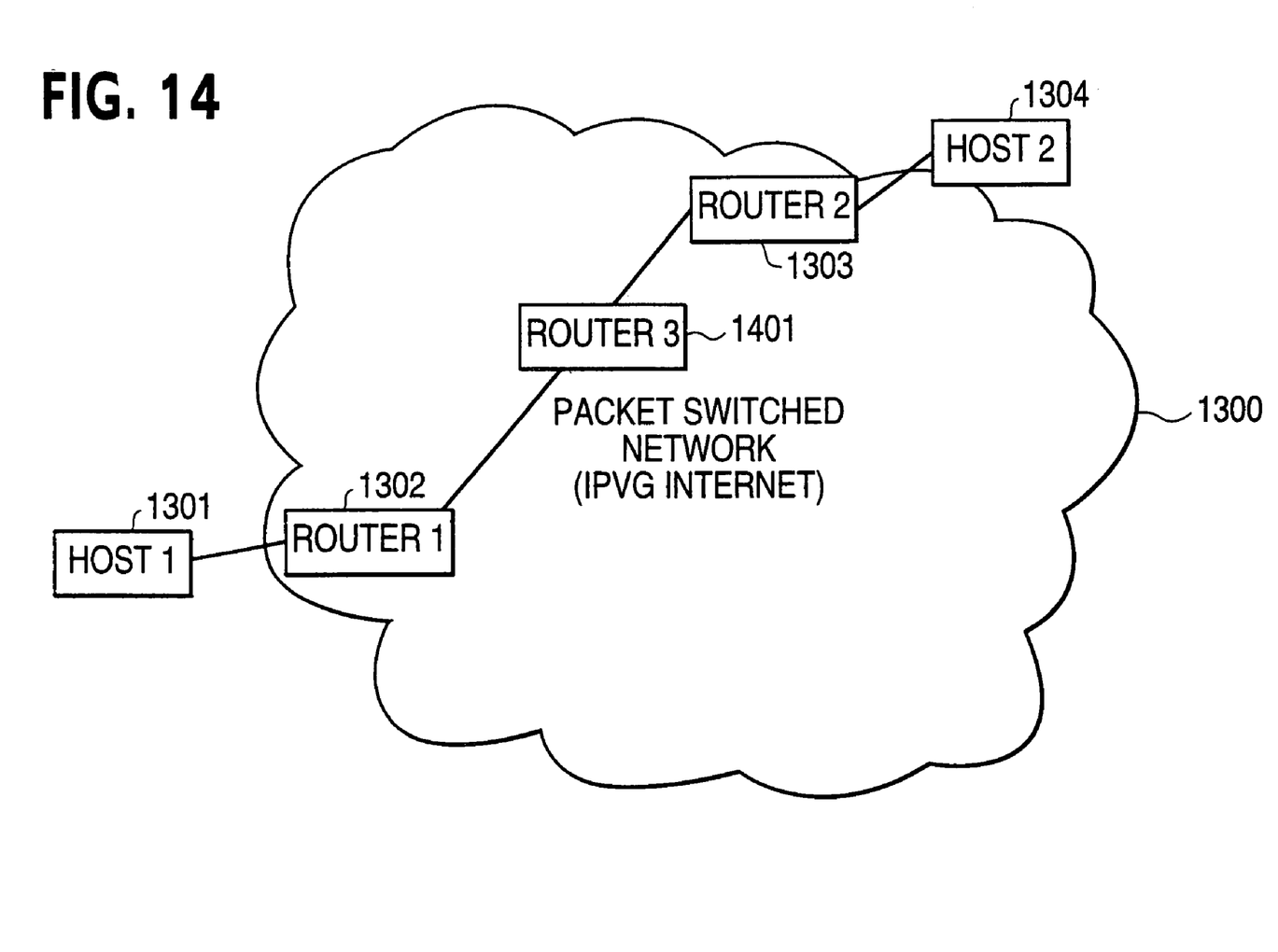
FIG. 14 is a schematic diagram illustrating the present invention when applied to a packet switched network having first, second and third routers and first and second hosts.

The present invention can also be applied to apparatus such as that illustrated in FIG. 14. The apparatus illustrated in FIG. 14 is similar to that illustrated in FIG. 13 with the exception of, for example, a switch 1401 which forwards the stream of packets transmitted from the first router 1302 to the second router 1303. A description of the procedures of the present invention for initiating IP header compression in the apparatus illustrated in FIG. 14 is provided relative to FIG. 8.

Figure 8:
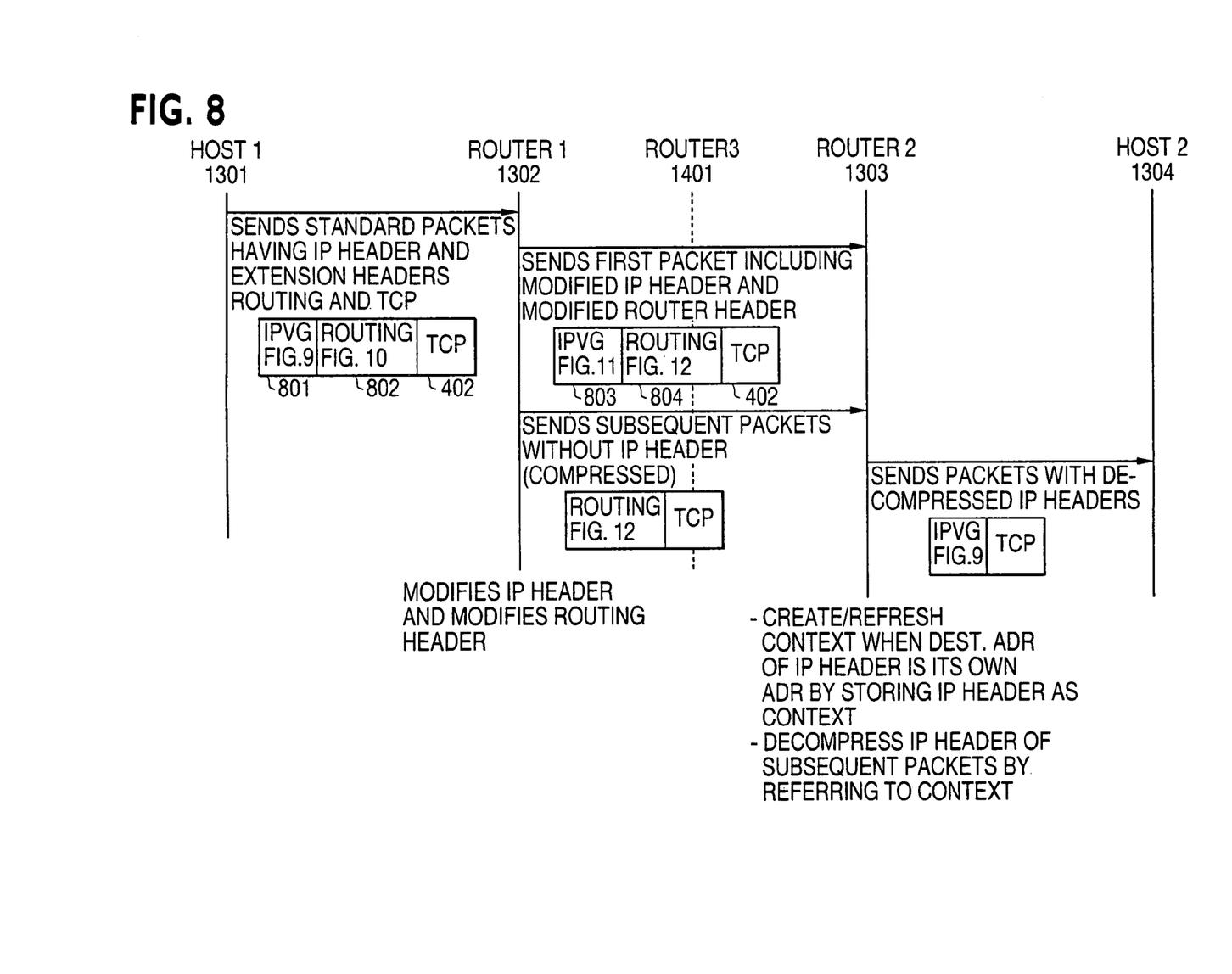
FIG. 8 is a schematic diagram illustrating the sequence of processings performed by the first and second hosts and the first, second and third routers when the packets sent by the first host include routing headers.
Figure 9:
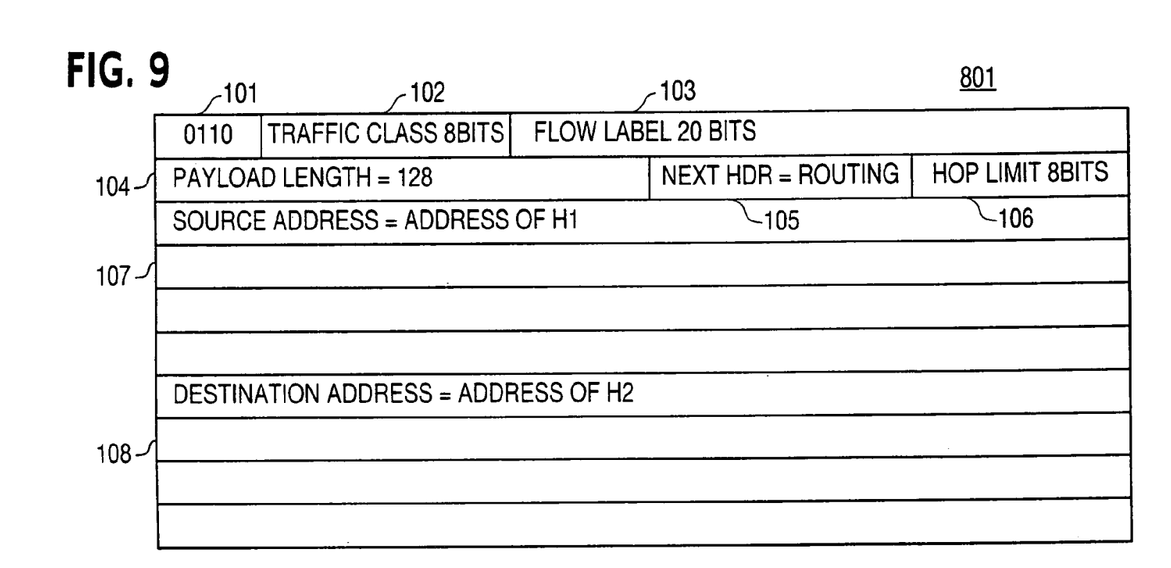
FIG. 9 is a schematic diagram illustrating the format of an IP header according to IPv6 of a packet sent from the first host.
Figure 10:
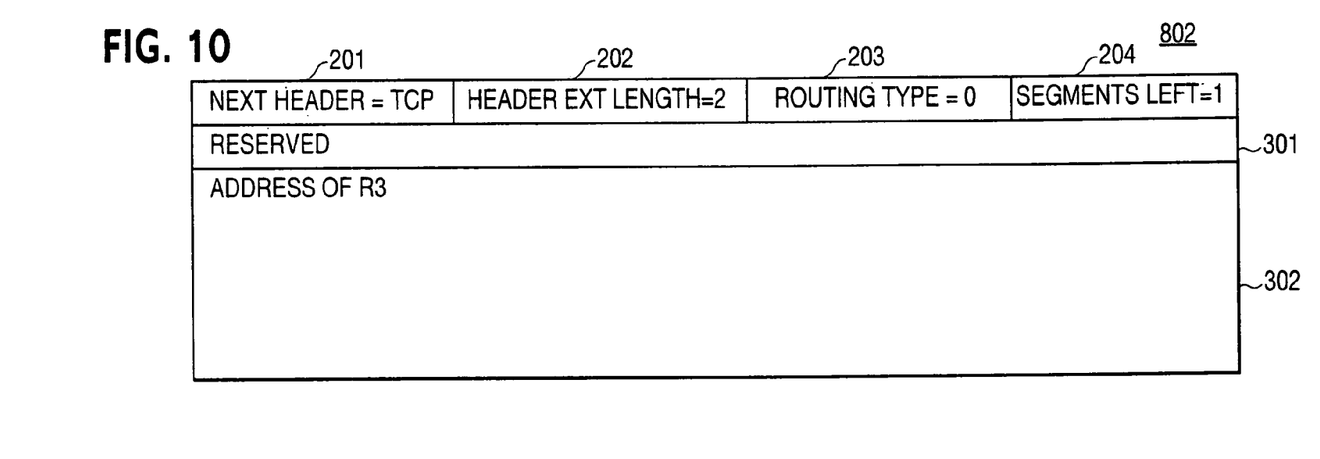
FIG. 10 is a schematic diagram illustrating the format of a routing header according to IPv6 included in the packet sent by the first host.

According to FIG. 8, the first host 1301 sends a standard stream of packets each having an IP header 801, the details of which are illustrated in FIG. 9, and extension headers including a routing header 802, the details of which are illustrated in FIG. 10, and a TCP header 402. The IP header 801 illustrated in FIG. 9 has the same format as the IP header 100 illustrated in FIG. 1 with the exception that some of the fields included in the IP header 801 are defined. For example, the Version field 101 stores a value of "0110" indicating an IPv6 header, the Next Header field 105 stores information indicating that the Next Header is a routing header, the Source Address field 107 stores an address of the first host 1301 and the Destination Address field 108 stores an address of the second host 1304.

The routing header 802 illustrated in FIG. 10 essentially has the same format as the routing header 300 illustrated in FIG. 3 with the exception that some of the fields included in the routing header are defined. Particularly, the Next Header field 201 stores information indicating that the Next Header is a TCP header, the Header Extension Length field 202 stores a value of "2" indicating that the header length is 2 octets, the Routing Type field 203 stores a value of "0" indicating that the routing header is a Type 0 routing header, the Segments Left field 204 stores a value of "1" indicating that one segment is left to be visited by the packet, and the Address field 302 stores an address of the switch 1401.

Figure 11:
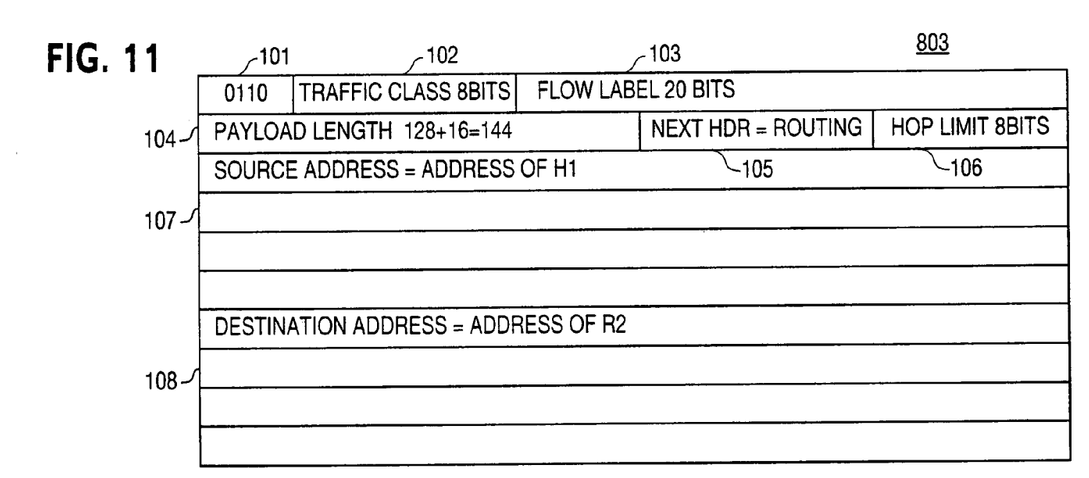
FIG. 11 is a schematic diagram illustrating the format of a modified IP header included in a full header packet sent from the first router.
Figure 12:
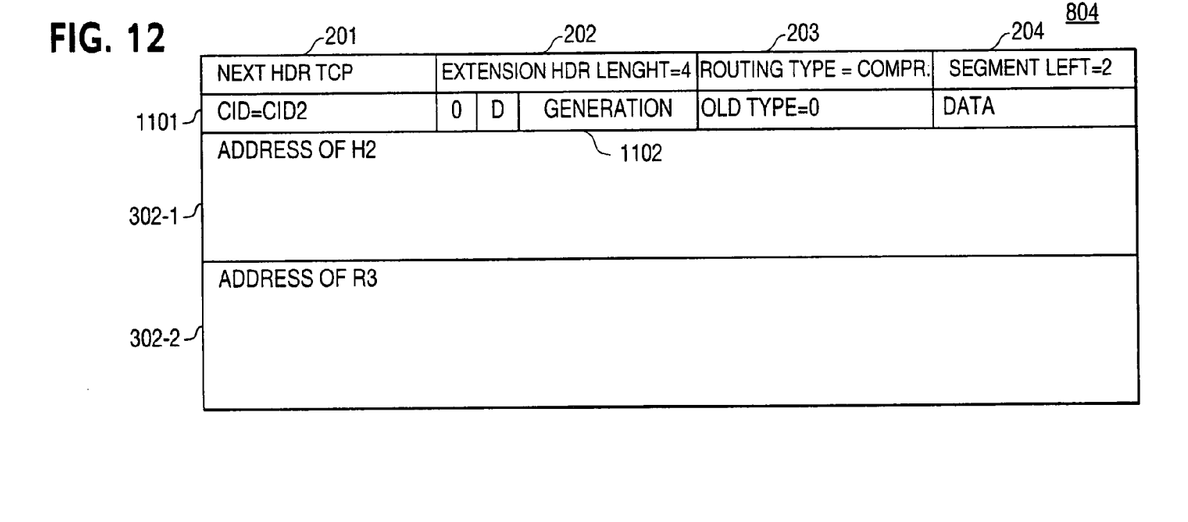
FIG. 12 is a schematic diagram illustrating the format of a modified routing header included in the full header packet sent from the first router.

The first router 1302 receives the stream of packets and modifies the IP header of the full header packet in the manner illustrated in FIG. 11 and modifies the routing header in the manner illustrated in FIG. 12. The first router 1302 then sends the full header packet including the modified IP header 803, the modified routing header 804 and the TCP header 402 to the second router 1303 via the switch 1401. It should be noted that the present invention can operate with any type of payload protocol besides TCP, such as User Data Protocol (UDP), Routing Table Protocol (RTP) or Internet Control Message Protocol (ICMP).

The modified IP header 803 illustrated in FIG. 11 has the same format and essentially the same information stored in the fields thereof as the IP header 801 illustrated in FIG. 9. However, in the IP header 801 the address of the second host 1304 is stored in the Destination Address field 108, whereas in the IP header 803 the address of the second router 1303 is stored in the Destination Address field 108. Storing the address of the second router 1303 in the Destination Address field 108 of the IP header 803 causes the switch 1401 to not examine and process the full header packet since the address of the switch 1401 is not contained in the Destination Address field 108 of the IP header 803. Essentially, the switch 1401 passes the full header packet on toward its destination. Storing the address of the second router 1303 in the Destination Address field 108 of the IP header 803 causes the second router 1303, upon receipt of the full header packet, to examine and process the full header packet in a manner so as to initiate IP header decompression. All other packets having an address other than the second router 1303 in the Destination Address field 108 of the IP header 803 need not be examined and processed by the second router 1303.

FIG. 12 illustrates the modified routing header 804 to be transmitted in the full header packet, along with the modified IP header 803, from the first router 1302 to the second router 1303. The routing header 804 essentially has the same format as the routing header 300 illustrated in FIG. 3 with the exception that some of the fields included in the routing header 804 are defined. Particularly, the Next Header field 201 stores information indicating that the Next Header is a TCP header, the Header Extension Link field 202 stores a value of "4" indicating that the header length is 4 octets, the Routing Type field 203 stores a value of "COMPR", the Segments Left field 204 stores a value of "2" indicating that 2 segments are left to be visited by the packet, the first Address field 302-1 stores an address of the second host 1304 and the second address field 302-2 stores an address of the switch 1401.

Further, the routing header 804 provides various additional fields indicative of the context related to the compression of the IP header. Specifically, the routing header 804 includes a CID field 1101 which stores a context identifier CID2 and Generation field 1102 which stores information related to the context if the packet is a non-TCP packet.

The second router 1302 sends the full header packet including the modified IP header 803 and the modified routing header 804 to the second router 1303 via the third router 1304. The switch 1401 passes the full header packet on toward its destination since the Destination Address field 108 of the IP header 803 stores the address of the second router 1303. The second router 1303 upon receipt of the full header packet including the modified IP header 803 and the modified routing header 804 creates a context related to the packet stream to which the full header packet belongs or refreshes a previously stored context corresponding to the packet stream to which the full header packet belongs. The second router 1303 creates a context by storing information of the IP header 803 in corresponding relation to the CID stored in the CID field 1101 of the routing header 804. The second router 1303 refreshes the context by updating values and information of the previously stored IP header with values and information provided by the IP header 803 of the full header packet.

Similar to that described with respect to the present invention illustrated in FIG. 4, after conducting the above described procedures, IP header compression is initiated. Accordingly, the first router 1302 now sends all subsequent packets of the packet stream to the second router 1303 via the switch 1401 without the IP header. Alternatively, the subsequent packets of the packet stream could be sent with what could be termed as a compressed or shortened IP header which contains the CID and information corresponding to fields that are unpredictable or that change in small increments. Accordingly, from this point forward, IP header compression is being conducted so as to transmit a reduced amount of data from the first router 1302, which serves as the compressor, to the second router 1303, which serves as the decompressor. The second router 1303 decompresses the IP headers of the subsequent packets by referring to the previously stored context by use of CID2 and the Generation when the packets are non-TCP packets. Thus, the second router 1303 restores the subsequent packets to their original format including the IP header and sends the restored packets to the second host 1304.

Therefore, according to the above, the present invention provides a method and apparatus for initiating compression of IP headers of a stream of packets to be sent from a source apparatus to a destination apparatus by changing the destination address of the IP header of a full header packet to identify the address of a node such as router, which serves as an interface to the destination apparatus, or a host and passing the Context Identifier (CID) in generation fields in a routing header which immediately follows or is inserted to immediately follow the IP header.

By the above described operations, in the present invention, compression of the IP headers of the packets of the stream of packets are initiated. Compression of the IP headers of the packets of the stream of packets subsequent to the full header packet is accomplished by transmitting the packets without their IP headers or transmitting the subsequent packets with compressed headers each having the CID information and information of the IP header that is unpredictable. Decompression of the IP headers of the subsequent packets is accomplished by referring to the context using the CID and restoring the IP headers to the subsequent packets.

The present invention as described above, lessens the overhead for not only transmitting a stream of packets from a first node to a second node due to the compression of the IP headers but also lessens the processing required by the apparatus which perform the compression and decompression. Particularly, the present invention lessens the amount of processing required by the decompressor being that the decompressor need only perform a full inspection of the packets which identify the decompressor in its destination address. Thus, the present invention provides unique advantages over that of conventional apparatuses.

While the present invention has been described in detail and pictorially in the accompanying drawings it is not limited to such details since many changes and modifications recognizable to those of ordinary skill in the art may be made to the invention without departing from the spirit and the scope thereof.

I claim:

1. A method of initiating compression of an Internet Protocol (IP) header of packets of a stream of packets to be sent from a source apparatus to a destination apparatus in a packet switched network, said source apparatus being connected to said packet switched network by a first node and said destination apparatus being connected to said packet switched network by a second node, said method comprising the steps of:

modifying, at said first node, the IP header of a first full header packet of the stream of packets from the source apparatus so that a destination address field of the IP header of the first full header packet contains a second node address indicating a location of the second node, the second node address being different than a destination address indicating a location of the destination apparatus;

inserting, at the first node, a routing header in the first full header packet of the stream of packets, said routing header having context identification (CID) information identifying information of the IP header and the destination address indicating the location of the destination apparatus;

transmitting, from the first node to the second node, said first full header packet including the modified IP header and the inserted routing header; and initiating at the first node, header compression of IP headers of packets of the stream of packets subsequent to the first full header packet, when the second node receives said first full header packet including the modified IP header and the inserted routing header, wherein IP layer functionality is relied upon to establish a context in which compression is performed.

2. A method according to claim 1, wherein each of said first and second nodes is a router.

3. A method according to claim 1, further comprising the step of:

compressing IP header of each of the subsequent packets when IP header compression has been initiated.

4. A method according claim 3, wherein said compressing step comprises the step of:

transmitting the subsequent packets including the CID information without an IP header.

5. A method according to claim 3, wherein said compressing step comprises the step of:
transmitting each of the subsequent packets including the CID information with a compressed IP header which includes unpredictable IP header information.

6. A method according to claim 1, further comprising:
storing information of the IP header of the first full header packet as a context in corresponding relation to the CID information at the second node when the second node receives said first full header packet including the modified IP header and the inserted routing header.

7. A method according to claim 6, further comprising the step of:
compressing the IP headers of each of the subsequent packets when IP header compression has been initiated.

8. A method according to claim 7, wherein said compressing step comprises the step of:
transmitting each of the subsequent packets including the CID information without an IP header.

9. A method according to claim 7, wherein said compressing step comprises the step of:
transmitting each of the subsequent packets including the CID information with a compressed IP header which includes unpredictable IP header information.

10. A method according to claim 6, further comprising the step of:
decompressing at the second node each of the subsequent packets by using the CID information included in the subsequent packet to refer to the stored context.

11. A method according to claim 10, further comprising the step of:
transmitting, by the second node, the decompressed subsequent packets to the destination apparatus based on the destination address.

12. A method of initiating compression of an Internet Protocol (IP) header of packets of a stream of packets to be sent from a source apparatus to a destination apparatus in a packet switched network, said source apparatus being connected to said packet switched network by a first node and said destination apparatus being connected to said packet switched network by a second node, said method comprising the steps of:
modifying, at said first node, the IP header of a first full header packet of the stream of packets from the source apparatus so that a destination address field of the IP header of the first full header packet contains a second node address indicating a location of the second node, the second node address being different than a destination address indicating a location of the destination apparatus;
modifying, at the first node, a routing header in the first full header packet of the stream of packets to include context identification (CID) information identifying information of the IP header and the destination address indicating the location of the destination apparatus;
transmitting, from the first node to the second node, said first full header packet including the modified IP header and the modified routing header; and
initiating at the first node, header compression of IP headers of packets of the stream of packets subsequent to the first full header packet, when the second node receives said first full header packet including the modified IP header and the inserted routing header, wherein IP layer functionality is relied upon to establish a context in which compression is performed.

13. A method according to claim 12, wherein each of said first and second nodes in a router.

14. A method according to claim 12, further comprising the step of:
compressing IP header of each of the subsequent packets when IP header compression has been initiated.

15. A method according claim 14, wherein said compressing step comprises the step of:
transmitting the subsequent packets including the CID information without an IP header.

16. A method according to claim 14, wherein said compressing step comprises the step of:
transmitting each of the subsequent packets including the CID information with a compressed IP header which includes unpredictable IP header information.

17. A method according to claim 12, further comprising:
storing information of the IP header of the first full header packet as a context in corresponding relation to the CID information at the second node when the second node receives said first full header packet including the modified IP header and the modified routing header.

18. A method according to claim 17, further comprising the step of:
compressing the IP headers of each of the subsequent packets when IP header compression has been initiated.

19. A method according to claim 18, wherein said compressing step comprises the step of:
transmitting each of the subsequent packets including the CID information without an IP header.

20. A method according to claim 18, wherein said compressing step comprises the step of:
transmitting each of the subsequent packets including the CID information with a compressed IP header which includes unpredictable IP header information.

21. A method according to claim 17, further comprising the step of:
decompressing at the second node each of the subsequent packets by using the CID information included in the subsequent packet to refer to the stored context.

22. A method according to claim 21, further comprising the step of:
transmitting, by the second node, the decompressed subsequent packets to the destination apparatus based on the destination address.

23. A router for use in a packet switched network for initiating compression of an Internet Protocol (IP) header of packets of a stream of packets from the source apparatus to be sent from a source apparatus to a destination apparatus in the packet switched network, comprising:
first apparatus which modifies the IP header of a first full header packet of the stream of packets so that a destination address field of the IP header contains an address indicating a location of another router, the address being different than a destination address indicating a location of the destination apparatus;
second apparatus which inserts a routing header in the first full header packet of the stream of packets, said routing header having Context Identification (CID) information identifying information of the IP header in the destination address indicating the location of said destination apparatus;
third apparatus which transmits to said another router, said first full header packet including the modified IP header and the inserted routing header, header compression of the IP header of each packet of the stream of packets subsequent to the first full header packet being initiated upon receipt in said another router of said first full header packet including the modified IP header and the inserted routing header, wherein IP layer functionality is relied upon to establish a context in which compression is performed.

24. A router according to claim 23, further comprising:
fourth apparatus which compresses the IP header of each of the subsequent packets when IP header compression has been initiated.

25. A router according to claim 24, wherein said fourth apparatus comprises:
fifth apparatus which transmits the subsequent packets including the CID information without an IP header.

26. A router according to claim 24, wherein said fourth apparatus comprises:
sixth apparatus which transmits each of the subsequent packets including the CID information with a compressed header which includes unpredictable IP header information.

27. A router according to claim 23, wherein said third apparatus comprises:
seventh apparatus which stores information of the IP header of the first full header packet as a context in corresponding relation to the CID information.

28. A router according to claim 27, further comprising:
eighth apparatus which compresses the IP headers of each of the subsequent packets when the IP header compression has been initiated.

29. A router according to claim 23, further comprising:
ninth apparatus which stores information of the IP header of said full header packet in corresponding relation to the CID information in response to receipt of said first full header packet including the modified IP header and the inserted router header from said another router.

30. A router according to claim 29, further comprising:
tenth apparatus which decompresses packets subsequent to the first full header packet according to the stored CID information.

31. A system for initiating compression of an Internet Protocol (IP) header of packets of a stream of packets comprising:

a packet switched network including a source apparatus and a destination apparatus, said source apparatus being connected to said packet switched network by a first node and said destination apparatus being connected to said packet switched network by a second node;

means for modifying at said first node, the IP header of a first full header packet of the stream of packets from the source apparatus so that a destination address field of the IP header of the first full header packet contains a second node address indicating a location of the second node, the second node address being different than a destination address indicating a location of the destination apparatus;

means for inserting at the first node, a routing header in the first full header packet of the stream of packets, said routing header having context identification (CID) information identifying information of the IP header and the destination address indicating the location of the destination apparatus;

means for transmitting from the first node to the second node, said first full header packet including the modified IP header and the inserted routing header; and means for initiating at the first node, header compression of IP headers of packets of the stream of packets subsequent to the first full header packet, when the second node receives said first full header packet including the modified IP header and the inserted routing header, wherein IP layer functionality is relied upon to establish a context in which compression is performed.

32. The system according to claim 31, wherein each of said first and second nodes is a router.

* * * * *